(12) United States Patent
Clark et al.

(10) Patent No.: US 7,244,031 B2
(45) Date of Patent: Jul. 17, 2007

(54) LIGHT SOURCE ARRANGEMENT

(75) Inventors: Stephan R. Clark, Albany, OR (US);
Anurag Gupta, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 422 days.

(21) Appl. No.: 10/885,972

(22) Filed: Jul. 8, 2004

(65) Prior Publication Data

US 2006/0007683 A1    Jan. 12, 2006

(51) Int. Cl.
G03B 21/14    (2006.01)
F21V 9/00    (2006.01)

(52) U.S. Cl. .................... 353/84; 362/231

(58) Field of Classification Search .............. 353/84, 353/85, 94, 98; 362/230–231
See application file for complete search history.

(56) References Cited

U.S. PATENT DOCUMENTS

| | | | |
|---|---|---|---|
| 3,549,254 A | 12/1970 | Muir | |
| 3,972,616 A | 8/1976 | Minami et al. | |
| 4,150,396 A | 4/1979 | Hareng et al. | |
| 4,377,324 A | 3/1983 | Durand et al. | |
| 4,453,804 A | 6/1984 | Evans | |
| 4,585,301 A | 4/1986 | Bialkowski | |
| 4,754,272 A | 6/1988 | Illenberg et al. | |
| 5,428,408 A * | 6/1995 | Stanton | 348/742 |
| 5,900,982 A | 5/1999 | Dolgoff et al. | |
| 6,114,807 A | 9/2000 | Kavanagh | |
| 6,252,636 B1 * | 6/2001 | Bartlett | 348/743 |
| 6,505,939 B1 * | 1/2003 | Bierhuizen et al. | 353/94 |
| 6,561,654 B2 * | 5/2003 | Mukawa et al. | 353/31 |
| 6,692,129 B2 | 2/2004 | Gross et al. | |
| 6,698,892 B2 | 3/2004 | Peterson | |
| 6,869,185 B2 * | 3/2005 | Kaminsky et al. | 353/31 |
| 2002/0186350 A1 | 12/2002 | Peterson | |
| 2003/0133080 A1 | 7/2003 | Ogawa et al. | |
| 2004/0066492 A1 | 4/2004 | Nakashima et al. | |
| 2004/0070851 A1 | 4/2004 | Koba et al. | |

OTHER PUBLICATIONS

Charles W. McLaughlin, "Progress in Projection and Large-Area Displays", Proceedings of the IEEE, Apr. 2002, pp. 521-532, vol. 90, No. 4.
"Demonstrate Additive and Subtractive Color Primaries", efg's Computer Lab, Color Mix Lab Report Apr. 22, 2004, 3 pages, http://www.efg2.com/Lab/Graphics/Colors/ColorMix.htm.
"Kinoptics Reveals Single-Panel LCOS Solution", Insight Media, HDTV Forum 2003 Aug. 27, 2003, printed Apr. 14, 2004, 3 pages, http://www.insightmedia.info/news/kinopticsRevealsSinglePanelLC . . . .
"LCOS Color Methods", SpatiaLight Microdisplays, printed Apr. 14, 2004, 3 pages http://www.spatialight.com/Technology/lcos_color_methods.htm.
"LCOS:: A Single Chip Design", Gary Feng, posted May 20, 2003, printed Apr. 14, 2004 http://www.garyfeng.com/blog/doc/000962.html.
Shin-Tson Wu, "Projection LCDs", OSE 6938C: Lecture 11, Powerpoint Presentation, pp. 1-48.

* cited by examiner

*Primary Examiner*—Christopher Mahoney

(57) ABSTRACT

A light source arrangement has a first light source, a second light source and a dichroic mirror. The dichroic mirror is disposed with the first and second light sources and configured to reflect a predetermined portion of the light emitted from the first light source and to transmit the remaining portion. The dichroic mirror is also configured to reflect light emitted from the second light source so that it propagates in the same direction as the remaining portion of the light from the first light source which is transmitted through the dichroic mirror.

38 Claims, 3 Drawing Sheets

LIGHT SOURCE ARRANGEMENT

BACKGROUND OF THE INVENTION

Most arc lamps are often deficient in the red end of the spectrum. Thus, digital projectors which rely on these type of arc lamps for a source of light, tend to be deficient in the red region of the spectrum. Compensating for this requires a complex arrangement utilizing elliptical reflectors and is exacerbated in that it is difficult to design dichroic mirrors that function over a broad range of angles. A practical solution to this problem is therefore required.

DETAILED DESCRIPTION OF THE EXEMPLARY EMBODIMENTS

Figure 1:
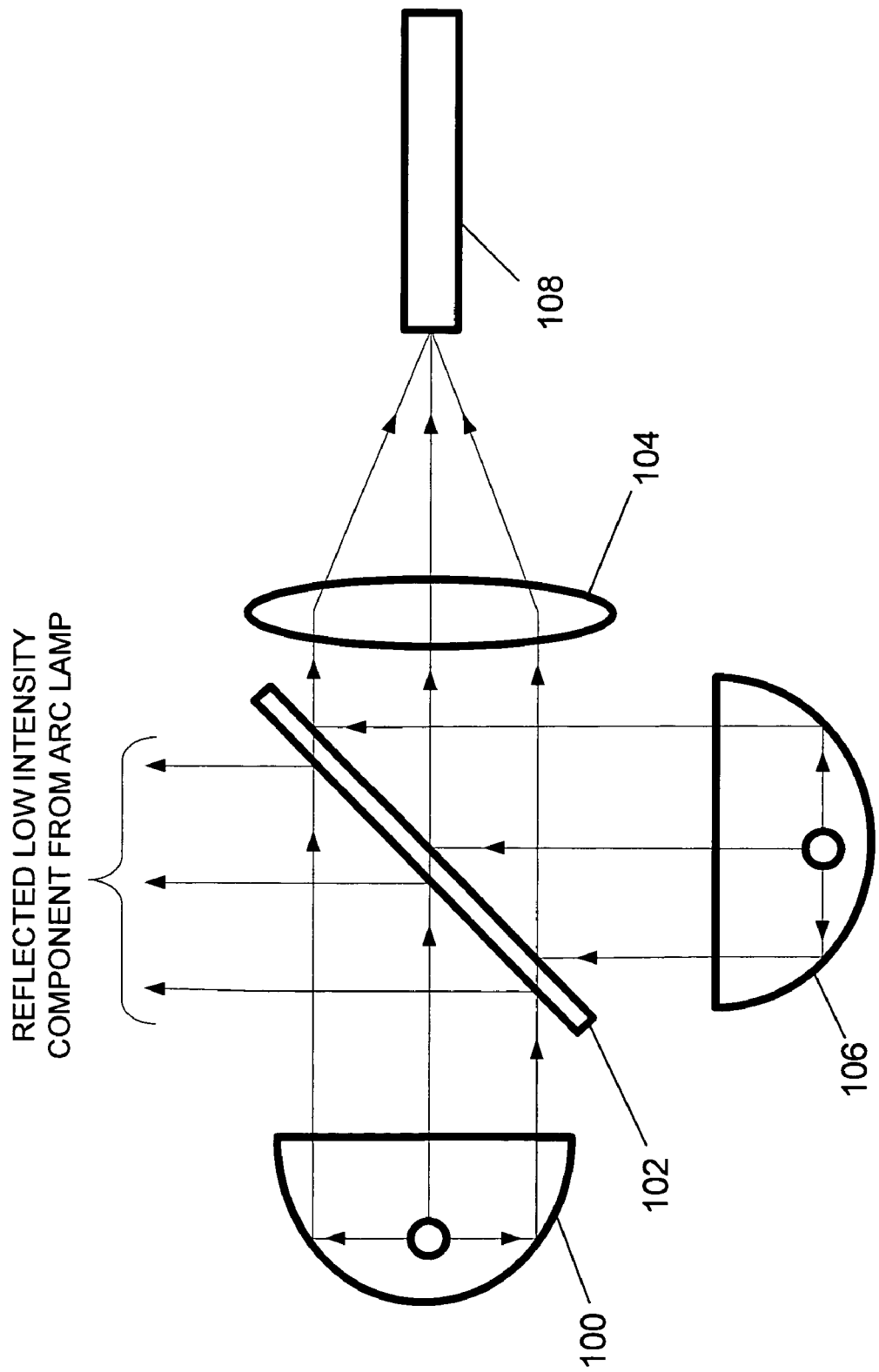
FIG. 1 is schematic illustration of a first embodiment of the invention.

FIG. 1 shows a first embodiment of the invention. In this arrangement, a first source of light such as an arc lamp and parabolic reflector arrangement 100 is arranged with a dichroic mirror 102 so that red light (in this embodiment), which is emitted from the arc lamp, is reflected while the blue and green light is permitted to pass therethrough to a condensing lens 104. A second source of light which, in this embodiment takes the form of a second lamp and parabolic reflector arrangement 106 and which acts as a source of red light, is arranged to direct a quasi-collimated beam of light normally to an axis along which the arc lamp and parabolic reflector arrangement 100, the dichroic mirror 102 and an integrating tunnel or rod 108, are aligned. The beam of light which is rich in the red spectrum (i.e. has a high intensity in the red wavelength) impinges on the dichroic mirror 102 and is reflected so that it propagates in a direction essentially parallel to the green-blue light which has passed through the mirror.

It should be noted at this point that light which is reflected using parabolic reflectors is not perfectly collimated due to the small but finite size of the source. Accordingly, light is referred throughout this disclosure as being "quasi-collimated."

The condensing lens, in this embodiment, is an aspheric condenser lens and is arranged to focus the red and green-blue light onto the input end of the integrating tunnel. It should be appreciated, however, the embodiments of the invention are not limited to this specific type of lens and other arrangements can be used if deemed suitable for the intended purpose. The integrating tunnel homogenizes the red and green-blue light from the two different sources in a manner well known in the optical arts.

Thus, with this arrangement, the weak red emission (low intensity in the red wavelength) or spectrum of the arc lamp and parabolic reflector arrangement 100, is reflected away and replaced by the red light from the second lamp and parabolic reflector arrangement 106. By appropriately selecting the two lamps with respect to power and output spectrum, it is possible to adjust the red, green and blue content of the light which is directed into the integrating tunnel 108 via the condensing lens 104, in a manner which overcomes the above mentioned red spectrum deficiency in an elegantly simple manner.

The lamps which are used to provide the red boost can include a low power XENON arc lamp, a red LED, or any other suitable source of red light.

This embodiment provides an easily implementable arrangement wherein an arc lamp is coupled with a source of red light in a manner which obviates the need for elliptical reflectors and a dichroic mirror which are adapted to function over a wide range of angles. That is to say, the use of parabolic reflectors allows quasi-collimation and an even distribution of light on the dichroic mirror over a narrow range of incident angles. This enhances the practicality of this type of arrangement.

Figure 2:
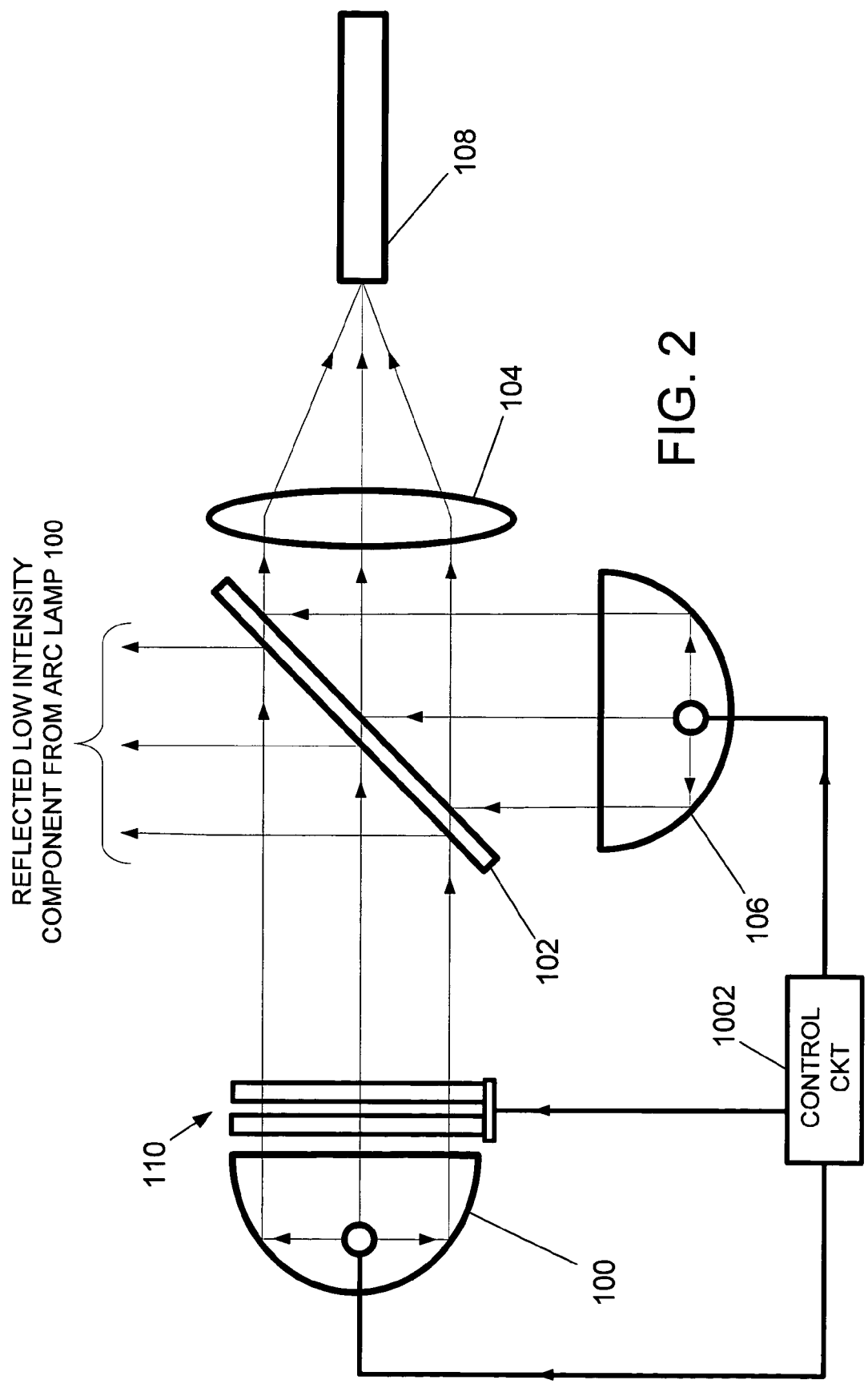
FIG. 2 is a schematic illustration of a second embodiment of the invention.

A second embodiment of the invention is shown in FIG. 2. As noted above, arc lamps are often deficient in the red end of the spectrum. This induces the situation wherein, in order to obtain a bright and saturated image color, the color solution used must take this into account. One method of compensation, which can, by way of example, be used with the first embodiment of the invention, comprises increasing the size of the red filter segment in a sequential color wheel. However, this tends to limit the dwell time available for the other colors and can reduce the overall brightness of an image. To then make the image brighter a white segment is added to the wheel. This de-saturates from the pure colors. This second embodiment avoids a reduction in the overall brightness of the image while still maintaining saturated colors, More specifically, in this second embodiment, an etalon (such as a Fabry Perot inferometer) 110 is disposed between the arc lamp and parabolic reflector arrangement 100 and the dichroic mirror 102. In this embodiment, the spacing between the etalon elements is controlled using piezo-electric transducer elements.

In a third embodiment, the etalon is tuned by making use of an electro-optic effect where an electric field changes the index of refraction of the material between the two mirrors of the interferometer thus obviating the need for any moving parts. The material between the two mirrors is selected based on its electric field susceptibility verses index change. With this, it is possible to separate out wavelength bands in an efficient manner and thus produce a gamut generator effect In embodiments using the etalon 110 disposed in the above-mentioned position, the arc lamp used in the arc lamp and parabolic reflector arrangement 100 is such as exhibit pronounced peaks (high intensities) in the blue and green wavelength regions but is such that the red is poor and exhibits a low intensity that tends to merge into a continuum. Thus, the blue and green spectral lines can be selected by the etalon tuning. Because the arc lamp has low red content (low red intensity) when the etalon is tuned for the red, very little light will pass through the etalon.

Thus, with these embodiments, the arrangement is such that the red rich light from the second lamp and parabolic reflector arrangement 106, is arranged to add into the beam but only when the etalon 110 is tuned to red. Thus, by synchronizing the lamp in the second lamp and parabolic reflector arrangement 106 with the operation of the etalon 110, such as through the control provided by control circuit 1002, it is possible to eliminate the red depletion.

In addition, the parabolic reflector of the arc lamp and parabolic reflector arrangement 100 enables the range of angles incident on the plates of the inferometer 110, to be confined within a small range. That is to say, as noted above, the arc lamp and parabolic reflector arrangement 100 produces a near or quasi-collimated beam of light and thus reduces the range of angles with which light impinges on the etalon.

In accordance with the embodiments of the invention which are equipped with an etalon, the etalon is such as to enable the system to also have color filtering at the source and acts as/replace a color wheel in the system. The color wheel is, of course, that which selects the spectral content of the subframes used to build up an image. Because the switching time of the etalons is very fast, the spoke time, which is the time during which the light spot is in two different colored sections of a color wheel, is reduced. Although the spoke light of a sequential color wheel can be used, it nevertheless requires special calibration and even then adds predominately to the white or brightness of the image. The etalon approach does not suffer from this problem and allows pure colors to added. The etalon therefore allows the color wheel to be replaced.

Figure 3:
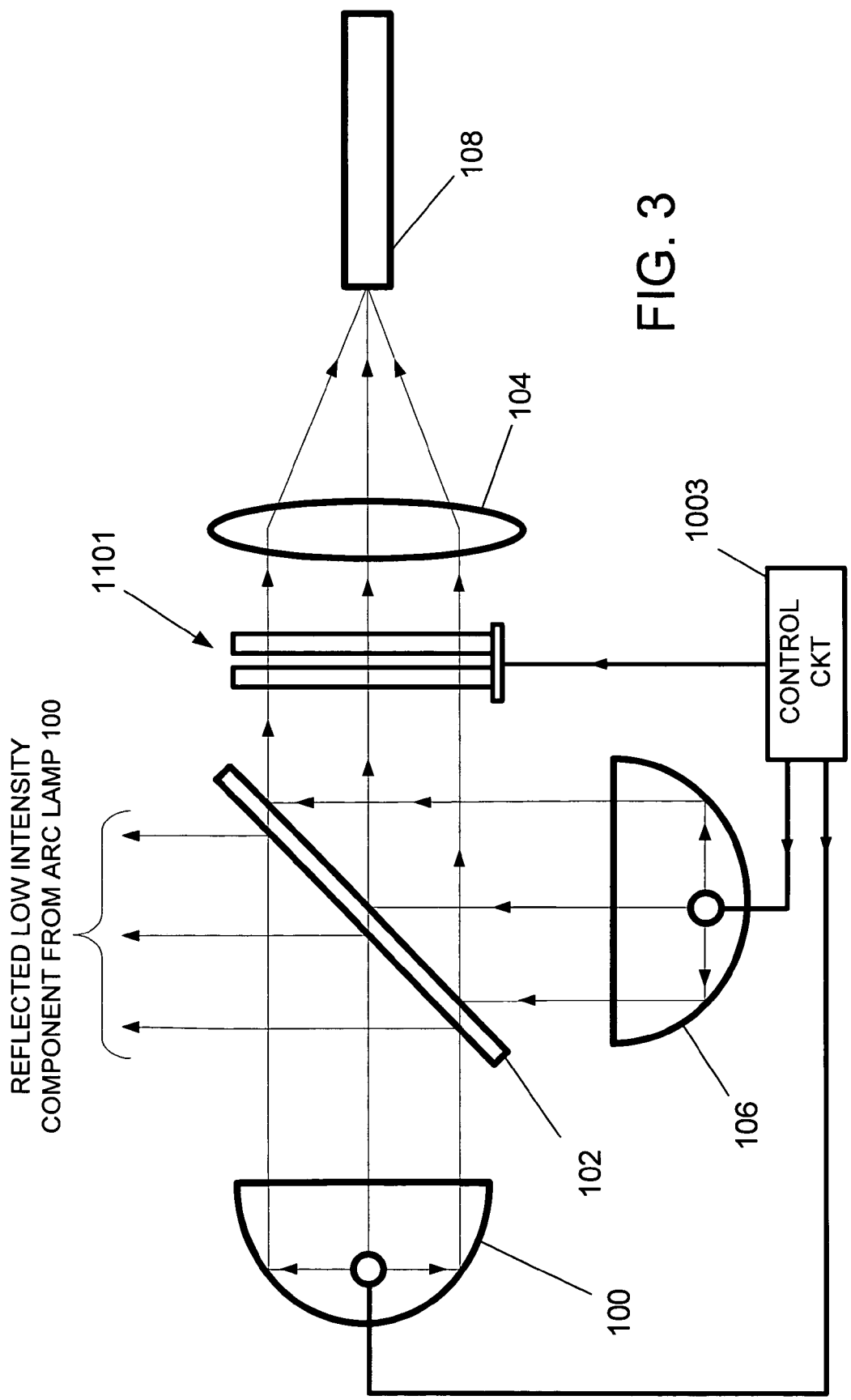
FIG. 3 is a schematic illustration of a further embodiment of the invention.

A fourth embodiment depicted in FIG. 3, is such that the etalon 1101 is disposed between the dichroic mirror 102 and the condensing lens 104. The etalon 1101 is switched under the control of control circuit 1003, in timed synchronism with the pulsing of the lamps in the two lamp and parabolic reflector arrangements 100 and 106, and therefore produces a gamut generator arrangement which controls the transmission of the red, green and blue light therethrough in a manner which attenuates the above-mentioned spoke time problem.

As will be understood, the etalon in the arrangement shown in FIG. 2 is such as to provide the color wheel effect with respect to the green and blue spectral content while the red is controlled by timed pulsing of the lamp in the second lamp and parabolic reflector arrangement 106. In the embodiment shown in FIG. 3, the etalon is positioned to enable all three colors to be controlled.

Although the invention has been described with reference to only a limited number of embodiments it will be understood that a person or skill in the art to which the invention pertains or mostly closely pertains, would, given the proceeding disclosure, be able to envisage various variations/embodiments without departing from the scope of the invention which is limited only by the appended claims.

For example, while the embodiments have been discussed in connection with the exclusion of red light from one of the light sources and the addition of red light from a second source (which produces a spectrum rich in the red component), the invention is not so limited and it can be envisaged that a light source, such as that which produces only a small amount of blue light (for example, could be combined with a mirror and second light source which has a suitably pronounced blue peak or intensity.

The invention claimed is:

1. A light source arrangement comprising:
   a first light source;
   a second light source;
   a dichroic mirror disposed with the first light source and second light source and configured to:
   reflect a predetermined portion of the light emitted from the first light source and to transmit the remaining portion; and
   reflect light emitted from the second light source so that it propagates in the same direction as the remaining portion of the light from the first light source which is transmitted through the dichroic mirror; and
   an etalon disposed between the first light source and the dichroic mirror, wherein the etalon is operatively connected with the second light source.

2. A light source arrangement as set forth in claim 1, wherein the first light source produces a first essentially collimated beam of light and wherein the second light source produces a second essentially collimated beam of light.

3. A light source arrangement as set forth in claim 2, wherein the first beam of light and the second beam of light have first and second axes respectively and wherein the dichroic mirror is arranged at a predetermined angle with respect to at least the first axis.

4. A light source arrangement as set forth in claim 3, wherein the predetermined angle is 45 degrees.

5. A light source arrangement as set forth in claim 2, wherein the first light source comprises a first parabolic reflector.

6. A light source arrangement as set forth in claim 2, wherein the second light source comprises a second parabolic reflector.

7. A light source arrangement as set forth in claim 1, further comprising a condenser lens arranged to receive and focus light from the dichroic mirror.

8. A light source arrangement as set forth in claim 7, wherein the condenser lens is an aspheric condenser lens.

9. A light source arrangement as set forth in claim 7, further comprising a light transmitting device which is arranged to receive light from the condenser lens.

10. A light source arrangement as set forth in claim 9, wherein the light transmitting device is an integrating tunnel.

11. A light source arrangement as set forth in claim 1, wherein the first light source comprises an arc lamp and parabolic reflector arrangement.

12. A light source arrangement as set forth in claim 1, wherein the second light source comprises parabolic reflector arrangement and a source of light which has a high intensity in a predetermined wavelength range and wherein the first light source produces light which has a low intensity in the predetermined wavelength range.

13. A light source arrangement as set forth in claim 12, wherein the predetermined wavelength range comprises one of red, green and blue light.

14. A light source arrangement as set forth in claim 1, wherein the etalon is a Fabry-Perot inferometer.

15. A light source arrangement as set forth in claim 1, wherein the operative connection between the inferometer and the second light source is configured to pulse the inferometer and the second light source in a predetermined synchronous relationship.

16. A light source arrangement comprising:
    a first light source;
    a second light source;

a dichroic mirror disposed with the first light source and
second light source and configured to:
reflect a predetermined portion of the light emitted from
the first light source and to transmit the remaining
portion;
reflect light emitted from the second light source so that
it propagates in the same direction as the remaining
portion of the light from the first light source which is
transmitted through the dichroic mirror;
a condenser lens arranged to receive and focus light from
the dichroic mirror; and
an etalon disposed between the dichroic mirror and the
condenser lens.

17. An image projection system comprising:
a first light source;
a second light source;
a dichroic mirror disposed with the first light source and
second light source and configured to:
reflect a predetermined portion of the light emitted from
the first light source and to transmit the remaining
portion; and
reflect light emitted from the second light source and
direct the light from the second light source so that it
propagates in the same direction as the portion of light
which is transmitted through the dichroic mirror; and
an etalon disposed between the first source of light and the
dichroic mirror, wherein the etalon is operatively connected with the second light source.

18. An image projection system as set forth in claim 17, further comprising a condenser lens arranged to receive and focus light from the dichroic mirror.

19. An image projection system as set forth in claim 17, wherein the condenser lens is an aspheric condenser lens.

20. An image projection system as set forth in claim 17, further comprising a light transmitting device which is arranged to receive light from the condenser lens.

21. An image projection system as set forth in claim 20, wherein the light transmitting device is an integrating tunnel.

22. An image projection system as set forth in claim 17, wherein the first light source comprises an arc lamp and parabolic reflector arrangement.

23. An image projection system as set forth in claim 17, wherein the second light source comprises a source of light which has a high intensity in a predetermined wavelength range and wherein the first light source produces light which has a low intensity in the predetermined wavelength range.

24. An image projection system as set forth in claim 23, wherein the predetermined wavelength range comprises one of red, green and blue light.

25. An image projection system as set forth in claim 17, wherein the etalon is a Fabry-Perot inferometer.

26. An image projection system as set forth in claim 17, wherein the operative connection between the etalon and the second light source is configured to control the etalon and the second light source in a predetermined synchronous relationship.

27. An image projection system comprising:
a first light source;
a second light source;
a dichroic mirror disposed with the first light source and
second light source and configured to:
reflect a predetermined portion of the light emitted from
the first light source and to transmit the remaining
portion; and
reflect light emitted from the second light source and
direct the light from the second light source so that it
propagates in the same direction as the portion of light
which is transmitted through the dichroic mirror; and
an etalon disposed between the dichroic mirror and the
condenser lens.

28. A method of producing light comprising:
generating light which has a low intensity in a predetermined spectrum using a first light source;
directing the light from the first light source against a dichroic mirror;
orienting the dichroic mirror so that the predetermined spectrum in the light from the first source is reflected and the remaining portion of the light from the first source is transmitted through the dichroic mirror;
generating light which has a high intensity in the predetermined spectrum using a second light source;
directing the light from the second light source against the dichroic mirror;
reflecting the light from the second light source using the dichroic mirror so that the light from the second light source and the remaining portion of the light from the first light source propagate in the same direction;
disposing an etalon in the path of the light from the second light source after it has been reflected off the dichroic mirror; and
timing the operation of the etalon to pass red, green and blue light in a predetermined sequence.

29. A method as set forth in claim 28, further comprising homogenizing the light from the second light source and the remaining portion of the light from the first light source after passing the light from the second light source and the remaining portion of the light from the first light source through a condensing lens.

30. A method as set forth in claim 29, wherein the step of homogenizing is carried out using an integrating tunnel.

31. A light source arrangement comprising:
first light source means for generating light which has a low intensity in a predetermined light spectrum;
first directing means for directing light from the first light source against dichroic mirror means which is oriented so that the predetermined light spectrum in the light from the first source is reflected and the remaining portion of the light from the first source is transmitted through the dichroic mirror;
a second light source means for generating light which has a high intensity in the predetermined light spectrum;
second directing means for directing the light from the second light source against the dichroic mirror and for reflecting the light from the second light source using the dichroic mirror so that the light from the second light source and the remaining portion of the light from the first light source propagate in the same direction; and
a gamut generator means for selectively transmitting red, green and blue light from at least one of the first light source and the second light source, wherein the gamut generator comprises an etalon, and wherein the operation of the etalon is timed in a predetermined relationship with pulsing applied to at least one of the first light source and the second light source.

32. A light source arrangement as set forth in claim 31, wherein the first light source comprises a first lamp and a first parabolic reflector for collimating the light from the first lamp.

33. A light source arrangement as set forth in claim 31, wherein the second light source comprises a second lamp and a second parabolic reflector for collimating the light from the second lamp.

34. A light source arrangement as set forth in claim 31, further comprising homogenizing means for homogenizing light from the second is light source and the remaining portion of the light from the first light source after passing through a condensing lens.

35. A light source arrangement as set forth in claim 34, wherein the homogenizing means comprises an integrating tunnel.

36. A light source arrangement as set forth in claim 31, wherein the gamut generator comprises etalon means disposed between the first light source and the dichroic mirror for selectively passing red, green and blue light therethrough.

37. A light source arrangement as set forth in claim 31, wherein the gamut generator comprises etalon means disposed in the path of the light from the second light source after it has been reflected off the dichroic mirror, for selectively passing red, green and blue light therethrough.

38. A light source arrangement as set forth in claim 31, further comprising:
   condenser lens means for condensing light from the dichroic mirror; and
   light homogenizing means for receiving and homogenizing light from the condenser lens means.

* * * * *